US012783652B2

(12) United States Patent
Costa et al.

(10) Patent No.: US 12,783,652 B2
(45) Date of Patent: Nov. 3, 2026

(54) DETECTING DATA LEAKAGE AND/ OR DETECTING DANGEROUS INFORMATION

(71) Applicant: SAP SE, Walldorf (DE)

(72) Inventors: Guilherme Costa, Lisbon (PT); Jan Portisch, Bruchsal (DE); Michael Hladik, Walldorf (DE)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 18/886,323

(22) Filed: Sep. 16, 2024

(65) Prior Publication Data

US 2025/0131086 A1 Apr. 24, 2025

(30) Foreign Application Priority Data

Oct. 23, 2023 (EP) .................................... 23205300

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 2009/0012842 | A1* | 1/2009 | Srinivasan .......... | G06F 16/3344 707/999.005 |
| 2020/0387836 | A1* | 12/2020 | Nasr-Azadani ........ | G06N 20/20 |
| 2024/0121074 | A1* | 4/2024 | Adir .................... | H04L 63/0428 |

OTHER PUBLICATIONS

Communication: "Extended European Search Report", dated Apr. 17, 2024 (Apr. 17, 2024), European Patent Office, European Application No. 23205300.98-1218, 8pgs.
Pan, Jeff Z. et al., "Content Based Fake News Detection Using Knowledge Graphs", Sep. 18, 2018 (Sep. 18, 2018), The Semantic Web—ISWC 2018, LNCS 11136, 2018, (pp. 669-683, 15 total pages), XP047671338, ISSN: 0302-9743, ISBN: 978-3-030-00670-9, [retrieved on Sep. 18, 2018], https://doi.org/10.1007/978-3-030-00671-6_39.
Amer-Yahia, Sihem et al., "From Large Language Models to Databases and Back: A discussion on research and education", arXiv:2306.01388v1 [cs.DB], Jun. 2, 2023 (Jun. 2, 2023), XP091527425, 7pgs.
Von der Weth, Christian et al., "Helping Users Tackle Algorithmic Threats on Social Media: A Multimedia Research Agenda", Proceedings of the 28th ACM International Conference on Multimedia, ACPub27, New York, NY, USA, Oct. 12, 2020 (Oct. 12, 2020) XP058478664, ISBN: 978-1-4503-7988-5, DOI: 10.1145/3394171.3414692, (pp. 4425-4434, 10 total pages).

* cited by examiner

*Primary Examiner* — Vance M Little
(74) *Attorney, Agent, or Firm* — Buckley, Maschoff & Talwalkar LLC

(57) ABSTRACT

Aspects relate to a computer implemented method, computer-readable media and a computer system for detecting data leakage and/or detecting dangerous information. The method comprises receiving a knowledge graph and extracting data from at least one network service. The method further comprises identifying statements in the extracted data. For each identified statement, the method further comprises determining whether the identified statement is public or private using the knowledge graph, and/or determining whether the identified statement is true or false using the knowledge graph.

17 Claims, 12 Drawing Sheets

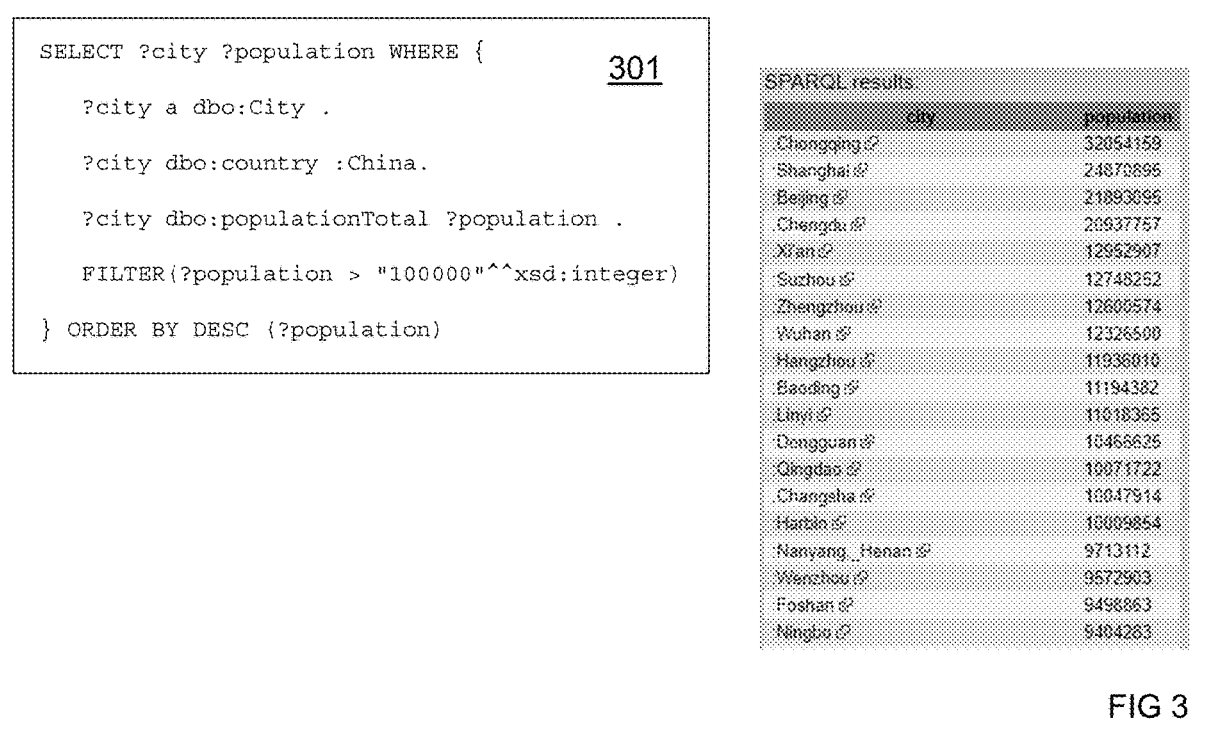

301

```
SELECT ?city ?population WHERE {
   ?city a dbo:City .
   ?city dbo:country :China.
   ?city dbo:populationTotal ?population .
   FILTER(?population > "100000"^^xsd:integer)
} ORDER BY DESC (?population)
```

SPARQL results

| city | population |
|---|---|
| Chongqing | 32054159 |
| Shanghai | 24870895 |
| Beijing | 21893095 |
| Chengdu | 20937757 |
| Xi'an | 12952907 |
| Suzhou | 12748252 |
| Zhengzhou | 12600574 |
| Wuhan | 12326508 |
| Hangzhou | 11936010 |
| Baoding | 11194382 |
| Linyi | 11018365 |
| Dongguan | 10466625 |
| Qingdao | 10071722 |
| Changsha | 10047914 |
| Harbin | 10009854 |
| Nanyang,_Henan | 9713112 |
| Wenzhou | 9572903 |
| Foshan | 9498863 |
| Ningbo | 9404283 |

FIG 3

| Warnings | | | |
|---|---|---|---|
| Work Items (4) | Search | | |
| **Fact** | **Correctness** | **Availability** | **Date** |
| SAP produced Xbox | False | Public | 01.01.2023 |
| Microsoft owns Business Objects | False | Public | 01.01.2023 |
| Oracle is buying company X | True | Private | 01.01.2023 |
| Company Y will release a smartphone | True | Private | 01.01.2023 |

FIG 9

DETECTING DATA LEAKAGE AND/ OR DETECTING DANGEROUS INFORMATION

CROSS-REFERENCE TO RELATED APPLICATIONS

The present application claims priority to, and the benefit of, EP Patent Application No. 23205300.9, filed 23 Oct. 2023, the contents of which are incorporated herein by reference for all purposes.

The technical field of the present disclosure is information protection. Specifically, disclosed aspects relate to detecting data leakage in the context of information security, wherein sensitive or confidential data has been transmitted or otherwise distributed to an unauthorized destination. Further aspects relate to detecting dangerous information that has been made available to the public and could be harmful to a person. Detecting such dangerous information may contribute to user safety.

Leaked data may have been distributed by a trusted agent or another insider. Conventionally, data leakage detection is handled by watermarking, e.g., a unique code is embedded in each distributed copy. If the copy is later discovered in the hands of an unauthorized party, the leaker can be identified. Another approach to detecting leaked data is the use of pattern matching in an intrusion detection system. Yet another approach may include search operations on encrypted data.

In some cases, data leakage or dangerous information may be detected by interacting with a language model, for example, a large language model based on a generative pre-trained transformer, such as ChatGPT. In some cases, the language model is a probability distribution over sequences of words. The large language model may have at least one million parameters or at least one billion parameters.

Dangerous information may include incorrect or false instructions for using a medicine, instructions on how to make a bomb that should not have been made public, incorrect instructions on how to build a machine that could lead to injury.

Such a language model may be trained in an unsupervised manner on large quantities of unlabeled human-readable text. More specifically, the language model may be trained on at least one million, at least 10 million, at least 100 million or at least one billion samples. A sample may be a document or a web page. At least a portion of the samples may be publicly available or otherwise available to unauthorized users.

In addition or alternatively, the language model may include a neural network. The neural network may be a deep neural network, for example, a neural network having one or more hidden layers. The neural network may have at least one million parameters (e.g., weights and biases) or at least one billion parameters. The neural network may have been trained on unlabeled (i.e., unannotated) text using unsupervised (that is, self-supervised) learning.

In addition or alternatively, the neural network may include a transformer that uses self-attention, thereby differentially weighting the significance of each part of input data provided to the neural network. Input to the neural network may be parsed into tokens and the tokens may be processed simultaneously by calculating weights for the tokens in successive layers of the neural network. The neural network may be designed to process sequential input data. The neural network may include weights (e.g., soft weights) that can be changed during runtime.

Accordingly, it may be desirable to interact with an application programming interface for a social media application or a language model in order to detect leaked data and/or to detect dangerous information.

According to an aspect, a computer implemented method for detecting data leakage and/or detecting dangerous information is provided. The method comprises receiving a knowledge graph and extracting data from at least one network service. The method further comprises identifying statements in the extracted data. The method further comprises, for each identified statement: determining whether the identified statement is public or private using the knowledge graph, and/or determining whether the identified statement is true (i.e., correct) or false (i.e., incorrect) using the knowledge graph.

The knowledge graph may be associated with or belong to an enterprise. The knowledge graph may store knowledge regarding skills, processes, experience, capabilities and insights that are relied upon in day-to-day operations of the enterprise. Contents of the knowledge graph may also include enterprise specific acronyms, departments of the enterprise and product specifications. The knowledge in the knowledge graph may enable the enterprise to react to business situations in a fast, professional and flexible manner. The knowledge graph may be expensive and labor intensive to construct and maintain.

The knowledge graph (i.e., semantic web and/or web of linked data) may be specified using the resource description framework (RDF) or an extension of the resource description framework, such as RDF-star (i.e., RDF*). RDF star enables descriptions to be added to edges in the knowledge graph, wherein the descriptions may include scores, weights, temporal aspects and provenance. RDF star enables statements about statements in the knowledge graph to be created. Specifically, it is possible to attach metadata to describe edges in the knowledge graph in addition to attaching statements to nodes in the knowledge graph. In the present disclosure, references to RDF may be understood to refer to RDF-star.

The knowledge graph may include a plurality of statements. The knowledge graph may be implemented as a directed graph. The statements may be referred to as triples or triple statements, with subject, predicate and object components. The subject, the object, and the predicate may be referred to as components of their respective statement. The subject and/or the predicate may be an RDF resource (e.g., the subject and/or the predicate may have the resource property of RDF and may be a type or a label). The object may be a literal (e.g., an RDF literal) having a defined data type, such as string, integer, Boolean or double (as defined in the extensible markup language (XML) schema definition language (XSD). Regarding RDF, please refer to the RDF specification, "Concepts and Abstract Syntax", https://www.w3.org/TR/rdf11-concepts/

In some cases, the statements of the knowledge graph may be close to human language.

The following exemplary three statements may be included in the knowledge graph:

EmissionsManagement isA BusinessCapability.
BusinessCapability rdfs:label "Businesss Capability".
EmissionsManagement SequenceID "5".

In addition or alternatively, the following four statements may be included in the knowledge graph:

sap:PrintReceipt rdf:type sap:Task.
sap:Task rdfs:label "Task"@en.
sap:Task rdfs:label "Process Task" @en.
sap:Task rdfs:label "Schritt" @de.

In addition or alternatively, the following four statements may be included in the knowledge graph:

sap:PrintReceipt sap: requires sap:Printer.

sap:PrintReceipt rdf:type sap:Task.

sap:PrintReceipt rdfs:label "Print Receipt".

sap:Printer rdfs:label "Printer".

In some cases, the knowledge graph includes a plurality of nodes connected by edges. The nodes may represent real world entities and the edges may represent relations between entities or relations between entities and types (i.e., classes) of the entities. Hence, predicates can be distinguished depending on whether they connect two entities or an entity and an entity type. The entities may also be referred to as resources. For each statement, the subject may correspond to a node of the knowledge graph, the object may correspond to a different node of the knowledge graph and an edge of the knowledge graph corresponding to the predicate may connect the subject node to the object node.

The nodes may have corresponding classes, such that each of the nodes has a corresponding class. The corresponding classes may be part of (or organized in) a schema (i.e., a data schema or an ontology). The schema may be defined in the RDF or the web ontology language. The following are examples of classes:

:State a rdfs: Class.

:EuropeanState a rdfs:Class.

:City a rdfs:Class.

Hence ":State" is a resource that is a class, more specifically, an RDF class. The class ":EuropeanState" is another resource that is a class, more specifically, a subclass of ":State". Hence, hierarchies of classes are possible. Moreover, multiple inheritance is also possible.

In addition or alternatively, the knowledge graph may be labeled and multi-relational. Accordingly, both the nodes and edges may have labels and the edges may have directions. The objects of the statements may be labels of the knowledge graph. The knowledge graph may be multi-relational in the sense that the edges have different labels. The nodes of the knowledge graph may be subjects or objects and the edges may be predicates.

In some cases, the schema includes properties. Each of the properties may apply to at least one of the classes in the schema. At least one of the properties may have a domain and/or arrange. Each of the properties may be used by (or apply to) at least one statement. The domain (e.g., rdfs: domain) may specify a class to which a subject belongs and the range (for example, rdfs:range) may specify a class to which an object belongs. More specifically, the domain may specify a class to which the subject of the statement belongs and the range may specify a class to which an object of the statement belongs. With regard to the RDF Schema, please refer to the W3C RDF Schema specification, https://www.w3.org/TR/rdf-schema/.

The following are examples of properties:

rdf:type a rdf:Property dbo:foundationPlace a rdf:Property.

:EuropeanState rdfs:subClassOf :State.

:locatedIn a rdf:Property.

:capitalOf a rdf:Property.

:capitalOf rdfs:subPropertyOf:locatedIn.

Hence, ":locatedIn" and ":capitalOf" are properties. Moreover, ":capitalOf" is a subproperty of ":locatedIn". Hence, properties can also form hierarchies. The property ":EuropeanState rdfs:subClassOf:State" indicates that ":EuropeanState" is a subclass in a class hierarchy including the class ":State" and the subclass ":EuropeanState".

Hence, the schema may provide a vocabulary for the knowledge graph. The knowledge graph may have predefined property prefixes, which can indicate whether a node (that is, a subject or object) is an instance of a class or a class (for example, a node may be a class if the node has a prefix "dbo," which represents DBPedia ontology, and a node may be an instance if the node has a prefix "dbr," which represents DBPedia resource. In certain cases, the directed graph can use a component of a URI to differentiate between instances and classes.

The knowledge graph may include statements which (explicitly or implicitly) indicate that certain nodes are classes. Accordingly, whether a specific node represents an instance or a class can depend on the underlying model (i.e., definitions in the schema). For example, whether a node is a class (and included in the schema of the knowledge graph) or an instance (and thus is not included in the schema of the knowledge graph) can be determined by checking the rdf: type property. If the rdf:type is owl: class, then the node is a class and is included in the schema; otherwise, the node is an instance (that is, instance of a class) and is not included in the schema.

In addition or alternatively, the statements from the knowledge graph cover a plurality of topical domains. Each statement may be identified by at least one uniform resource identifier (URI). At least one of the nodes and edges may be identified by a URI or an internationalized resource identifier the (IRI). More specifically, the nodes and edges may each be identified by a URI or an IRI. In some cases, one or more of the subject, the object and the predicate may be a URI. Some nodes (for example, nodes corresponding to objects) may be identified via a literal rather than a URI. The knowledge graph may be represented using the RDF. This graph may have a structure that is similar to known knowledge graphs such as DBPedia, Wikidata, BabelNet, DBkWik, Freebase and DBnaray.

Compared to relational databases, the knowledge graph has a more flexible data structure because the types of data provided by the knowledge graph can vary. For example, properties associated with different instances can differ even though these instances share the same class (e.g., "SAP_SE" and "BASF_SE" can have different property data although they share the same class "Company"). A relational database can be represented in a knowledge graph format, i.e., the knowledge graph may be a higher-level abstraction of the relational database.

In certain examples, the nodes of the knowledge graph can be organized in a hierarchical structure where a lower-level node (representing a more specific object) may be connected to a higher-level node (representing a more generic object) by one or more edges. The lower-level node (or the lower-level object it represents) may be a descendant of the higher-level node (or the higher-level object it represents), and the higher-level node (or the higher-level object it represents) may be an ancestor of the lower-level node (or the lower-level object it represents).

The method may further comprise receiving one or more rules corresponding to the knowledge graph. The rules may be reasoning, logic, inference or RDF schema rules. The method may further comprise materializing the knowledge graph by applying the rules to statements of the knowledge graph to compute additional statements. Materializing the knowledge graph may be described as adding context data or references to context data to the knowledge graph. Materializing the knowledge graph may be implemented by applying reasoning or applying the rules to the knowledge graph.

Numbered examples of rules are the following:

1. every object of the predicate "dbo:foundationPlace" is a country
2. every subject of the predicate ":capitalOf" is a city
3. every object of the predicate ":capitalOf" is a country The first rule may be implemented by setting the range of the "dbo:foundationPlace" predicate so that its objects must be instances of a country class. The second rule may be implemented by setting the domain of the ":capitalOf" predicate so that its subjects must be instances of a city class. Similar to the first rule, the third rule may be implemented by setting the range of the ":capitalOf" predicate so that its objects must be instances of a country class.

An example of materializing (i.e., reasoning) follows. The materializing is based on the following statement:

:Madrid :capitalOf :Spain.

and the following properties:

:capitalOf rdfs:domain :City.

:capitalOf rdfs:range :Country

:capitalOf rdfs:subPropertyOf:locatedIn.

Accordingly, materializing may include combining a statement with one or more properties. More specifically, materializing may include combining a statement with properties (e.g., property restrictions) that limit the subject or object of the statement. The combinations may be used to determine further statements, e.g., classes that the subject of the statement is an instance of and/or classes that the object of the statement is an instance of. Materializing may include determining statements that can be implicitly derived from the knowledge graph and adding the determined statements to the knowledge graph. Three numbered examples of reasoning follow:

1. :Madrid :capitalOf :Spain.
   :capitalOf rdfs:domain :City.
   →:Madrid a :City.
2. :Madrid :capitalOf :Spain.
   :capitalOf rdfs:range :Country
   →:Spain a :Country.
3. :Madrid :capitalOf :Spain.
   :capitalOf rdfs:subPropertyOf :locatedIn.
   →:Madrid :locatedIn :Spain.

Each of the three examples above combines the statement, ":Madrid :capitalOf :Spain" with a different property in order to compute (i.e., derive) an additional statement. In the first example, the statement ":Madrid :capitalOf :Spain" is combined with the property ":capitalOf rdfs:domain :City" to compute ":Madrid a :City", which indicates that the subject of the statement, ":Madrid", belongs to (i.e., is an instance of) the class ":City". In the second example, ":Madrid :capitalOf :Spain" is combined with the property ":capitalOf rdfs:range :Country" to compute ":Spain a : Country", which indicates that the object of the statement, ":Spain", is an instance of the class ":Country". In the third example, ":Madrid :capitalOf :Spain" is combined with the property ":capitalOf rdfs:subPropertyOf:locatedIn" to compute ":Madrid :locatedIn :Spain", which indicates that the subject ":Madrid" has the property ":locatedIn" with respect to the object ":Spain".

Continuing the example, given the statement and the properties before materialization, the following SPARQL Protocol and RDF Query Language (SPARQL) query would return FALSE:

ASK {:Madrid a :City.}

After materialization, the same SPARQL query would return TRUE. Materializing the knowledge graph may increase the effectiveness and/or usability of the knowledge graph for detecting data leakage and detecting dangerous information. The knowledge graph may be materialized before the knowledge graph is received.

In addition or alternatively, the method may further comprise sorting the knowledge graph such that nodes of the knowledge graph are grouped together their neighbors. The sorting may be carried out after materializing the knowledge graph. Sorting may comprise determining a list of nodes in the knowledge graph and adding a randomly selected node to the list of nodes. For each node in the new list of nodes, determining the connected nodes. For each of the connected nodes, if the respective node is in the knowledge graph, adding the respective node to the list of nodes. The method may further comprise removing the node from the list of nodes.

Pseudocode for the sorting algorithm described in the preceding paragraph is provided below:

```
graphNodeSet = graph.getAllNodes( )
backlog = [ ]
WHILE graphNodeSet NOT EMPTY
  IF backlog IS EMPTY
    // perform a random pick/jump in the graph
    backlog.add(graphNodeSet.randomDraw( ))
  END IF
  FOR r IN backlog DO
    // cover the full neighborhood of n
    FOR n IN r.connectedTriple DO
      serialize(r, n.edge, n.node)
      IF n.node IN graphNodeSet
        backlog.add(n.node)
      END IF
    END FOR
    graphNodeSet.remove(r)
  END FOR
```

The serialize( ) function above may verbalize a respective triple ("r"—subject, "n.edge"—object, "n.node"—predicate). In other words, the serialize( ) function may translate a statement from the knowledge graph into a serialization format, such as RDF/XML, RDFa, Notation3 (.n3), or Turtle (.ttl), N-Triples, or JSON-LD.

The sorting algorithm may be referred to as a clustering algorithm and may ensure topicality, i.e., that sorted statements are close to each other in the sense that they relate to similar topics or the same topic. In other words, neighboring statements are semantically similar. This may increase the effectiveness of the knowledge graph in detecting data leakage and detecting dangerous information.

In some cases, determining whether the identified statement is true or false using the knowledge graph comprises determining whether a subject predicate combination of the identified statement has a maximum cardinality, i.e., a maximum number of objects. When the identified statement has a maximum cardinality and the maximum cardinality of the subject predicate combination of the identified statement is exceeded, determining that the identified statement is false. For example, the maximum cardinality may be 1. When the subject predicate combination has a maximum cardinality of 1, then the subject predicate combination may only be TRUE appear in combination with one object and may be false in combination with any other object.

In addition or alternatively, the at least one network service may include one or more of the following: a web service, a social networking service, a service providing an interface to a language model. The network service may run on a server and listen for network requests on a port. The web service may use the hypertext transfer protocol (HTTP) and may listen for network requests on port 80 and/or 443.

The at least one network service may include one or more of the following: a web service, a social networking service, a service providing an interface to a language model. Extracting data from the at least one network service may comprise accessing at least one application programming interface via the at least one network service. Extracting data from the at least one network service may comprise web scraping using HTTP, wherein the web scraping may comprise web crawling.

In the context of the social networking service, the application programming interface may provide access to settings and allow updates to the settings. The application programming interface may further allow access and updates to content, to create and get posts, to get comments or insights and perform other update actions. The application programming interface may also enable searching, filtering and data extraction.

Web scraping may comprise extracting content from a website, specifically underlying HTML code and/or data stored in a database. Web crawling may comprise systematically browsing webpages as well as indexing, updating and retrieving webpage content.

Examples of social networking services include Facebook, LinkedIn and Twitter (or X). Examples of language models include ChatGPT, PaLM, Megatron, Titan and Chinchilla.

The method may further comprise computing a vector for each uniform resource identifier (URI) of the knowledge graph, such that each of the uniform resource identifiers of the knowledge graph has a corresponding vector. The method may further comprise creating a copy of the knowledge graph including the computed vectors. The method may further comprise modifying the copy of the knowledge graph to include a number of true statements (i.e., true facts) that is equal to a number of false statements (i.e., false facts) in the copy of the knowledge graph. In the context of the present disclosure, the statements may also be referred to as facts.

The combination of a URI, a vector and an endpoint identifier may be referred to as an embedding. In this context, an endpoint may be a URL determining a web service or API that can be used to retrieve information from a knowledge graph. The knowledge graph may be deployed on a graph database server and the graph database server may have a software layer that exposes the web service or API. An exemplary endpoint is as follows:

https://github.com/blazegraph/API

There may be a 1-1 correspondence between knowledge graphs and endpoints.

A purpose of computing the vectors for each URI of the knowledge graph may be so that the vectors can be used to train a machine learning model. Computing the vectors may be referred to as training embeddings. Training embeddings may be a machine learning task of learning a low-dimensional representation of the knowledge graph's entities and relations (edges) while preserving the semantic meaning of the entities and relations. The embeddings may be used for link prediction, triple classificartion, entity recognition, clustering and relation extraction.

A purpose of modifying the copy of the knowledge graph so that the number of true statements is equal to the number of false statements may be so that the copy of the knowledge graph can be used to train the machine learning model. Specifically, it might not be possible to train the machine learning model properly if the knowledge graph only has true statements or there is a substantial difference between the number of true statements and the number of false statements.

Modifying the copy of the knowledge graph to include a number of true statements that is equal to a number of false statements may comprise, when the copy of the knowledge graph has more false statements than true statements, randomly deleting false statements. When the copy of the knowledge graph has more true statements than false statements, adding false statements to the copy of the knowledge graph by randomly selecting and combining subjects, predicates, and objects from different statements in the knowledge graph. Each component of a statement in the copy of the knowledge graph may have a corresponding computed vector. For each statement in the copy of the knowledge graph, the method may comprise computing, using the computed vectors corresponding to the statements, a similarity value measuring the similarity of the statement to each of the other statements in the copy of the knowledge graph. The similarity value may be computed using a cosine similarity measurement.

Accordingly, the similarity value may be computed by taking the dot product of the computed vectors divided by the product of the lengths of the vectors. Hence, to proportional vectors may have a cosine similarity of 1, two orthogonal vectors may have a similarity of 0 and two opposite vectors may have a similarity of −1.

The vectors may be computed such that each relation (i.e., predicate) in the knowledge graph is characterized by two vectors, a norm vector of a hyperplane and a translation vector on the hyperplane. The hyperplane may be normal to an embedding space of the vectors. The vectors may be computed using a pure translational model, such as, TransH, TransD, TransA or TransE. Further information regarding pure translational models may be found in "Knowledge Graph Embedding by Translating on Hyperplanes", Wang et al., 2014.

A benefit of computing the vectors with TransH may be that there will be a small distance (e.g., close to 0, where 0 is perfect similarity) between true statements and a large distance (e.g., close to 2, where 2 is perfect dissimilarity) between false statements. The distance may be a cosine distance (i.e., the complement of the cosine similarity or 1-cosine similarity). Close to 0 may be less than 0.1 or less than 0.2. Close to 2 may be greater than 1.8 or greater than 1.9.

The method may further comprise training a statistical model using the computed similarity values and information indicative of whether the similarity values correspond to true or false statements in the copy of the knowledge graph. The statistical model may be a logistic regression model. Determining whether the identified statement is true or false using the knowledge graph may comprise applying the statistical model to the identified statement. When the statistical model returns a probability for an identified statement that is greater than a specified threshold, determining that the identified statement is true. When the statistical model returns a probability for the identified statement that is less than or equal to the specified threshold, determining that the identified statement is false.

The method may further comprise identifying sentences in the extracted data, comprising carrying out term frequency-inverse sentence frequency with stemming and lemmatization on the extracted data. For further details on term frequency-inverse sentence frequency with stemming and lemmatization see "Sentence retrieval using Stemming and Lemmatization with Different Length of the Queries", Boban et al., 11 Jun. 2020. The method may further comprise identifying, using named entity recognition, entities in the extracted data. Named entity recognition may be a subtask of information extraction that seeks to locate and classify named entities mentioned in unstructured text into predefined categories.

The method may further comprise identifying, via relation extraction, implied relations between the identified entities. The relation extraction may include deriving structured text from the extracted data. A result of the named entity recognition and the relation extraction may be one or more $entity_1$-predicate-$entity_2$ combinations.

The method may further comprise mapping, via entity linking, the identified entities to the knowledge graph. The mapping may comprise named entity disambiguation. The method may further comprise mapping predicates of the identified $entity_1$-predicate-$entity_2$ combinations to properties of the knowledge graph. The method may further comprise providing, based on the mapping of identified entities to the knowledge graph in the mapping of predicates to properties of the knowledge graph, at least one result statement, each result statement including a subject-predicate-object triple, each component of the subject-predicate-object triple including a uniform resource identifier of the knowledge graph.

In addition or alternatively, determining whether the identified statement is true or false (e.g., 0 or 1) and/or determining whether the identified statement is public or private comprises comparing the identified statement with statements in the knowledge graph.

In some cases, comparing the identified statement with the statements in the knowledge graph may comprise determining (e.g., finding) at least one comparable statement for the identified statement. The comparable statement for the identified statement may have at least one value in common with the identified statement. Specifically, the comparable statement for the identified statement may have at least one of a subject, a predicate, and an object in common with the identified statement. For example, the comparable statement may have the same subject as the identified statement but a different predicate and a different object than the identified statement. A plurality of the statements in the knowledge graph may include metadata indicating whether the respective statement is (i.e., the statement is tagged as) true or false, and/or a plurality of the statements in the knowledge graph may include metadata indicating whether the statement is (i.e., the statement is tagged as) public or private.

When one of the statements in the knowledge graph does not include metadata indicating whether the statement is true or false, the method may further comprise determining that the statement is true. Determining whether the identified statement is true or false may comprise identifying a maximum cardinality of the at least one comparable statement and determining whether the identified statement exceeds the maximum cardinality. In some cases, if the identified statement exceeds the maximum cardinality than the identified statement is determined to be false.

Each statement of the knowledge graph may include a subject-predicate-object triple, wherein each subject-predicate-object triple is composed of a subject, a predicate, and an object. The subject, the predicate and the object may each be represented (i.e., identified) by a uniform resource identifier.

Extracting data from the at least one network service may comprise randomly selecting a statement from the knowledge graph. The method may further comprise constructing a query string based on a subject and a predicate of the statement and calling, using a uniform resource locator (URL), at least one application programming interface (API) via the at least one network service and using the query string.

Extracting data from the at least one network service may comprise building a natural language processing question based on a randomly (i.e., pseudo-randomly) selected statement from the knowledge graph. The method may further comprise issuing a call to the at least one application programming interface using the question.

According to a second aspect, a computer program is provided. The computer program may be tangibly embodied in a computer readable medium. The computer program comprises instructions that, when the program is executed by a computer, cause the computer to carry out to any one of the methods described above.

According to a third aspect, a computer system for detecting data leakage and/or detecting dangerous information is provided. The computer system may include a memory and at least one processor. The memory may include instructions, which, when executed, cause the at least one processor to receive a knowledge graph, and extract data from at least one network service. The instructions, when executed, may also cause the at least one processor to identify statements in the extracted data. For each identified statement, the instructions, when executed, may cause the at least one processor to determine whether the identified statement is public or private using the knowledge graph, and/or determine whether the identified statement is true or false using the knowledge graph.

The subject matter described in this disclosure can be implemented as a method or on a device, possibly in the form of one or more computer programs (e.g., computer program products). Such computer programs may cause a data processing apparatus to perform one or more operations described in the present disclosure.

The subject matter described in the present disclosure can be implemented in a data signal or on a machine readable medium, where the medium is embodied in one or more information carriers, such as a CD-ROM, a DVD-ROM, a semiconductor memory, or a hard disk. In particular, disclosed subject matter may be tangibly embodied in a non-transitory machine (computer) readable medium.

In addition, the subject matter described in the present disclosure can be implemented as a system including a processor, and a memory coupled to the processor. The memory may encode one or more programs to cause the processor to perform one or more of the methods described in the application. Further subject matter described in the present disclosure can be implemented using various machines.

Details of one or more implementations are set forth in the exemplary drawings and description that follow. Other features will be apparent from the description, the drawings, and from the claims.

BRIEF DESCRIPTION OF THE DRAWINGS

FIG. 3 shows an exemplary SPARQL query and results of the query.

FIG. 9 shows an exemplary output of the system of FIG. 7.

DETAILED DESCRIPTION

In the following text, a detailed description of examples will be given with reference to the drawings. Various modifications to the examples may be made. In particular, one or more elements of one example may be combined and used in other examples to form new examples.

Figure 1:
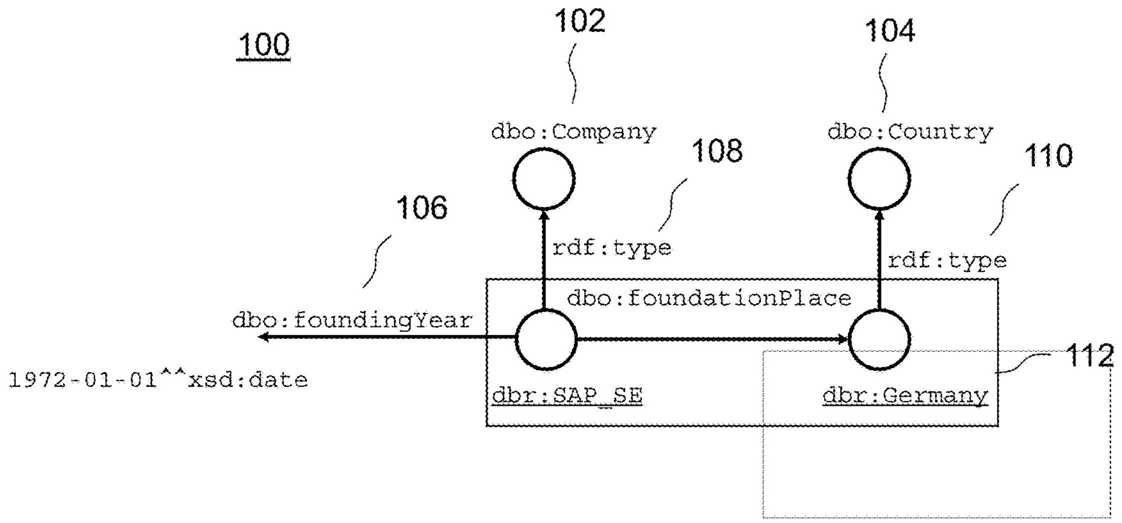
FIG. 1 shows an exemplary knowledge graph.

FIG. 1 shows a knowledge graph 100. Nodes of the knowledge graph 100 are shown as circles and edges of the knowledge graph are shown as arrows. Hence, the knowledge graph 100 is a directed graph. The knowledge graph 100 includes node labels 102, 104, 106, 108, 110, where the node labels (i.e., labels) are URIs and defined in the resource description framework (RDF). The node labels 102 and 104 are objects, the edge labels 106, 108 and 110 are predicates. The string "1972-01-01" may also be a node label (i.e., an object) having a type of xsd:date.

The knowledge graph 100 includes a statement 112 (i.e., triple statement) having a subject "dbr:SAP_SE", a predicate "dbo:foundationPlace" and an object dbr:Germany", each of which are URIs defined in RDF. An exemplary serialization of the statement 112 is dbr:SAP_SE dbo:foundationPlace dbr:Germany. A schema of the knowledge graph 100 may be defined via RDF schema (RDFS) or Web ontology language (OWL) from the World Wide Web Consortium (W3C).

Figure 2:
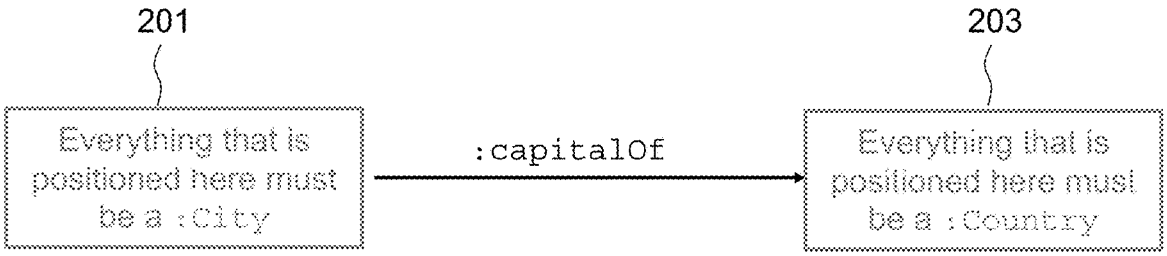
FIG. 2 shows the domain and range of a property in a schema of a knowledge graph.

FIG. 2 shows a domain 201 and a range 203 of a property, ":capitalOf". The domain 201 and the range 203 may be defined as follows:

:capitalOf rdfs:domain :City.

:capitalOf rdfs:range :Country.

FIG. 3 shows an exemplary SPARQL query 301 of the knowledge graph 100. The query 301 is configured to determine an answer to the following question: what is the population of cities in China which have more than 100,000 inhabitants? The results of executing the query 301 are also shown.

Figure 4:
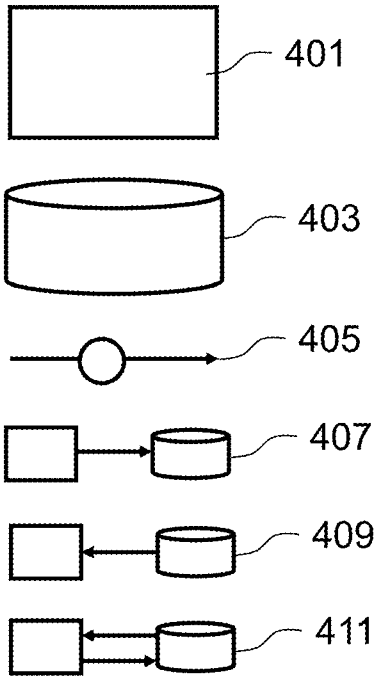
FIG. 4 shows a block diagram notation for subsequent figures.

FIG. 4 shows a block diagram notation used in subsequent figures. A system component 401 is shown as a rectangle. System components may also be shown as ovals. Storage 403 is shown as a cylinder with an oval profile. A request between system components 405 is shown as an arrow including a circle. A write between a system component and storage is shown at 407. A read between system component and storage is shown at 409. Read and write between system component and storage is shown at 411.

Figure 5:
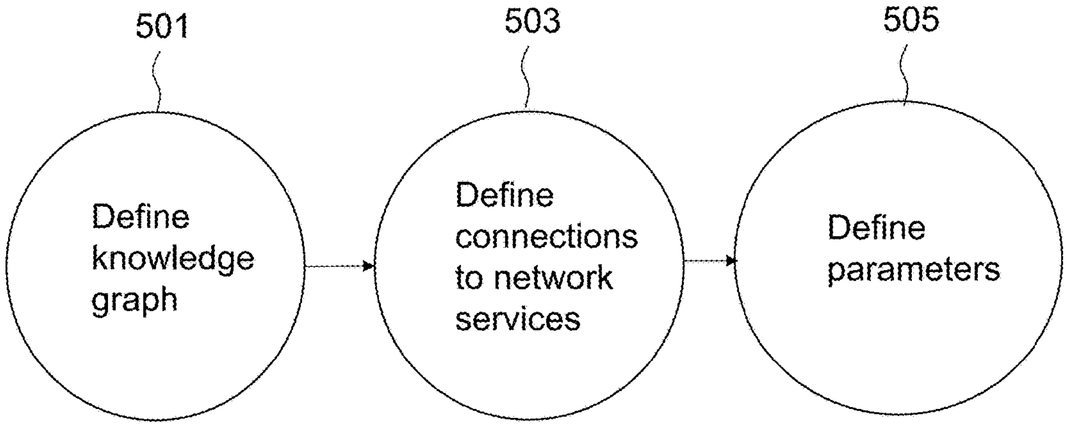
FIG. 5 shows steps of a method that could be carried out according to some embodiments.
Figure 7:
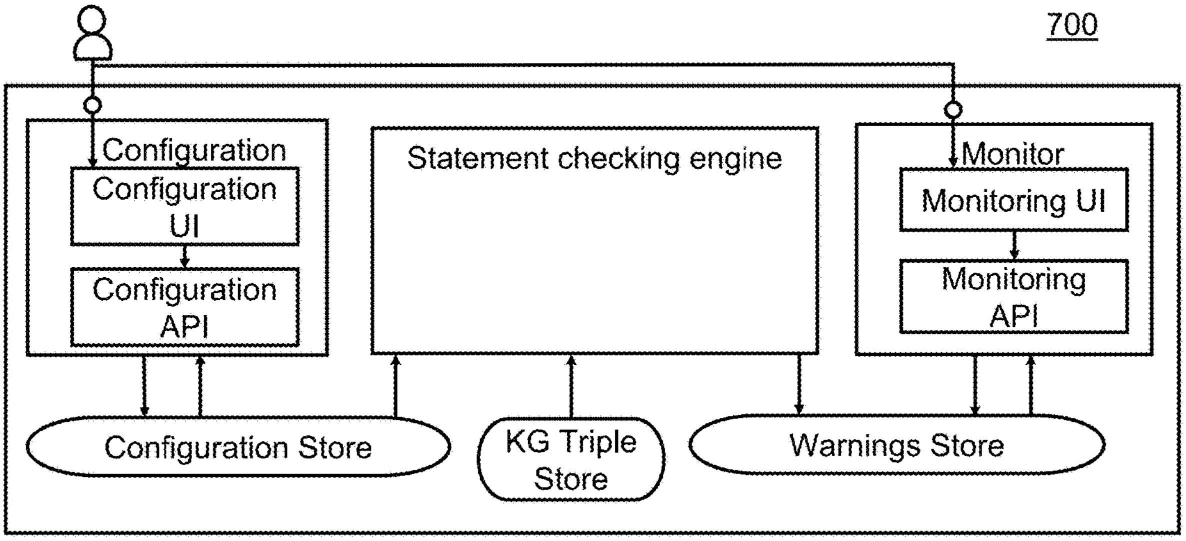
FIG. 7 shows a computer system according to some embodiments.

FIG. 5 shows configuration steps that may be taken before receiving the knowledge graph 100. The configuration steps shown in FIG. 5 may be carried out using a configuration user interface and/or a configuration API as shown in FIG. 7 and discussed in more detail below. At 501, the knowledge graph 100 may be defined. More specifically, a way of connecting to the knowledge graph 100 over a network may be defined. For example, an Internet protocol (IP) address and a transmission control protocol (TCP) port for use in connecting to the knowledge graph 100 may be defined. The knowledge graph 100 may be a corporate or organizational knowledge graph. At 503, connections to network services may be defined. More specifically, connections to APIs accessible via the network services may be defined. At 505 parameters may be defined. The parameters may determine periodicity of calls to the APIs, warning levels or thresholds.

Figure 6:
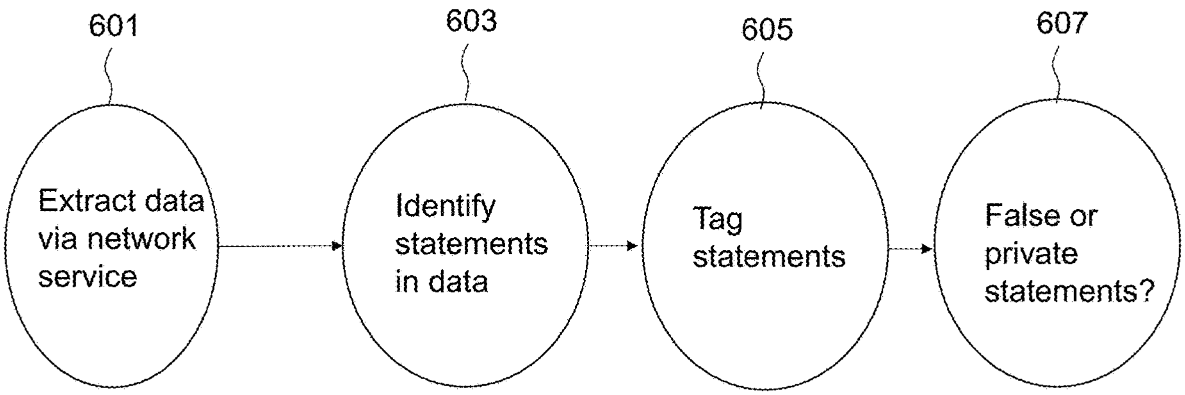
FIG. 6 shows further steps of the method that could be carried out according to some embodiments.
Figure 8:
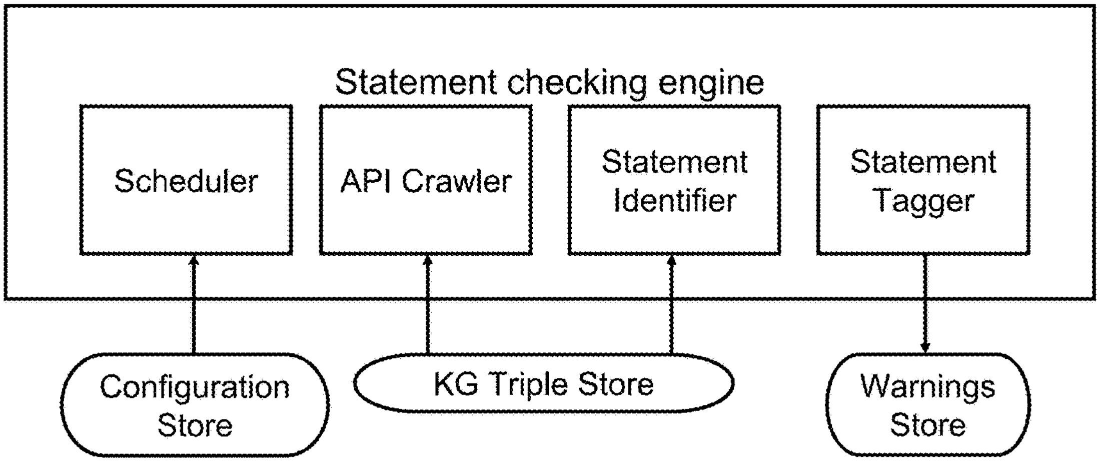
FIG. 8 shows a statement checking engine that may be included in the computer system.

FIG. 6 shows steps that may be carried out according to some embodiments. The steps shown in FIG. 6 may be carried out by a statement checking engine, as shown in FIGS. 7 and 8, and discussed in more detail below. At 601, a network service may be accessed (e.g., one of the network services to which connections were defined at 503) and an API may be called (e.g., one of the APIs defined at 503). The API may be used to extract data via the network service. At 603, statements (i.e., facts) may be identified in the extracted data. At 605, the identified statements may be tagged. More specifically, it may be determined whether an identified statement is public or private and/or whether the identified statement is true or false using the knowledge graph 100. At 607, warnings may be generated for false or private statements. The warnings may enable detection of data leakage, e.g., via the distribution of private statements and/or the detection of dangerous information, e.g., via the distribution of false statements. Exemplary tagged statements are shown in table 1 below:

TABLE 1

| Statement Identifier | Correctness | Availability |
|---|---|---|
| 27654398633567 | False | Public |
| 17354628935672 | False | Public |
| 10243568365493 | True | Public |
| 10243568365494 | True | Private |

FIG. 7 shows a system 700 according to some embodiments. The system 700 may include the configuration user interface, which may be used to carry out the steps described above with respect to FIG. 5. The configuration user interface may include a computer and monitor so that a user may interact with the system 700. The system 700 may include a configuration API, which may allow remote access to the system 700 in order to carry out configuration steps. The system 700 may include a configuration store, which may enable storage of system configuration properties. The system 700 may include a statement checking engine, as discussed in more detail with regard to FIG. 8. The system 700 may include a monitoring user interface and a monitoring API. The monitoring user interface may include a computer and monitor so that the user can determine information about the health of the system 700, e.g., review logs and/or warnings generated by the system 700. The monitoring API may enable the user to remotely access the system 700 in order to review logs and/or warnings. A warnings store may enable storage of warning information. The knowledge graph 100 may be stored in a KG triple store.

FIG. 8 shows the statement checking engine of FIG. 7 in more detail. The statement checking engine may include a scheduler. The scheduler may access the network services and APIs defined with respect to FIG. 5 and may access each of the APIs according to a specified schedule. For example, the scheduler may be configured to access a network service associated with the Facebook API every 15 minutes in order to extract data from the network service and identify statements in the extracted data. Each network service and/or API may be associated with a time period (e.g., 30 minutes) and data may be extracted via the network service according to the time period.

An API crawler may determine, for each API, whether the API has a type of standard or conversational and may use this information to issue a corresponding request to the API. The conversational type may correspond to APIs for language models. The standard type may correspond to other APIs, e.g., for social network services, web services, and search engine services. For example, if the API is standard, the API crawler may select a statement from the knowledge graph 100 and use label information of a subject and a predicate of the statement to construct a query for the API. The statement may be randomly selected from the knowledge graph 100. The API (e.g., an API for a social network service) may be called using the query.

If the API is conversational, the API crawler may build a natural language processing question from a randomly selected statement of the knowledge graph 100. The natural language processing question may be constructed as described in the European patent application entitled, "Providing Data from a Directed Graph to a Language Model", application Ser. No. 23/177,538.8, filed with the European patent office on Jun. 6, 2023. The API crawler may issue a call to an API (e.g., an API for a language model) using the natural language processing question. A URI for the API may be determined based on configuration settings provided as discussed above with respect to FIG. 5. A exemplary call from the API crawler to a conversational API is as follows:

```
curl -X POST https://api.openai.com/abc/xyz \
-H "Content-Type: application/json" \
-H "Authorization: Bearer API_KEY_HERE" \
-d '{ "prompt": "Is Business Objects a product from Microsoft?",
"max_tokens": 100, "temperature": 0.7, "n": 1, "stop": "." }'
```

A response provided via the conversational API (e.g., from the language model) may be as follows:

{ "choices": [ { "text": "Yes, Microsoft has a product called Business Objects. It is a business intelligence and reporting tool that was originally developed by the French company Business Objects and is now owned by Microsoft." } ] }

From the response above, the following statement may be identified:

fact=('Microsoft', 'product or material produced', 'Business Objects')

The above-identified statement may be compared with statements in the knowledge graph to determine that the above-identified statement is false.

Responses obtained by the API crawler may be forwarded to a statement identifier of the statement checking engine. The statement identifier may include a plurality of modules. Specifically, the statement identifier may include a sentence identifier module, a named entity recognition module, a relation extraction module, an entity linking module, and a predicate mapping module. The sentence identifier module may identify sentences in the extracted data, for example, by carrying out term frequency-inverse sentence frequency with stemming and lemmatization on the extracted data. The named entity recognition module may identify, using named entity recognition, entities in the extracted data. The named entity recognition may be a subtask of information extraction that seeks to locate and classify named entities mentioned in unstructured text into predefined categories. The relation extraction module may identify implied relations between the identified entities. The relation extraction module may include deriving structured text from the extracted data. The relation extraction module may produce a plurality of $entity_1$-predicate-$entity_2$ combinations. The predicate mapping module may map the $entity_1$-predicate-$entity_2$ combinations to properties of the knowledge graph. In algorithms 1 to 4 below, statements are referred to as facts.

The statement identifier may operate according to algorithm 1, as shown below:

```
Input: Text T
Step 1: Split T into sentences using the Sentence Identifier module
Step 2:        for sentence in sentences:
                   use NER module to identify entities
                   use RE module to identify relations
  result is a set of distinct entity1-predicate - entity2 combinations
Step 3: for entity1-predicate - entity2 in Step 2:
                   use Entity Linking module to map entities to Knowledge Graph instances
                   use Predicate Mapping module to map relations to Knowledge Graph
properties
   result is a set of facts F; each being of type f = (s,p,o), s,p,o ∈ Knowledge
Graph.
Output:        F
```

The input text for algorithm 1 may be data extracted from at least one network service, e.g., via an API accessible via the network service. The knowledge graph instances may be different or distinct knowledge graphs.

The statement checking engine may also include a statement tagger. The statement tagger may depend on a machine learning model. The machine learning model may be trained after the configuration discussed in connection with FIG. 5. Operation of the statement tagger is shown in algorithm 2 below. The outputs of algorithm 2 include a plurality of embeddings, one embedding for each resource (i.e., node or edge) in the knowledge graph, and a plurality of vectors, e.g., TransH vectors. The outputs of algorithm 2 may be stored for later use by algorithm 3, which is described in more detail below. Algorithm 2 may be implemented as follows:

```
Input: Graph G
Step 1: Train TransH embeddings for each resource in G using G's
True facts
Step 2: Create a copy G' of G and change it so as to include an equal
number of True and False facts:
  if G' has more False than True facts:
     randomly delete False facts
  else:
     add False facts by randomly selecting and combining Subject,
```

-continued

Predicates and Objects
Step 3: For each fact in G', F = (s, p, o) and corresponding embeddings ($s_e$, $p_e$, $o_e$), $$\text{compute } cs = \frac{(s_e + p_e) \cdot o_e}{\|(s_e + p_e)\| \, \|o_e\|}.$$

Step 4: Using the cs values computed for each fact and the information of whether they are 1 − True or 0 − False, train a Logistic Regression model that predicts a probability of a fact being True or False given cs:

$$P(cs) = \frac{1}{1 + e^{-(\beta_0 + \beta_1 cs)}}$$

Output: TransH vectors, $\beta_0$ and $\beta_1$

A goal of training embeddings, as exemplified in step 1 of algorithm 2, is that given a subject s and a predicate p, if s and p are added together they produce a vector close (e.g., a small cosine distance from) the embedding for a corresponding object o.

A goal of algorithm 2 is to produce a vector for each resource (i.e., each node and each edge) of the knowledge graph, with some exceptions. For example, if a node or edge only appears in a false fact, the node or edge will have no embedding. It may be that only facts with resources having embeddings will be used for algorithm 3. In other words, facts with resources not having embeddings will not be used for the machine learning (e.g., logistic regression) model.

s,p,o may refer to a subject, a predicate, and an object respectively. $s_e$,$p_e$,$o_e$ may refer to a subject embedding, a predicate embedding, and an object embedding respectively. cs may refer to cosine similarity. Accordingly, step 1 of algorithm 2 may involve computing a vector for each uniform resource identifier of the knowledge graph 100, such that each of the uniform resource identifiers of the knowledge graph has a corresponding vector. Step 2 of algorithm 2 may include creating a copy of the knowledge graph 100 including the computed vectors. Step 2 may further include modifying the copy of the knowledge graph 100 to include a number of true statements that is equal to a number of false statements. Step 3 of algorithm 2 may include for each statement in the copy of the knowledge graph, computing, using the computed vectors corresponding to the statements, a similarity value measuring the similarity of the subject and the predicate of a statement to the object of the statement in the copy of the knowledge graph. In other words, step three of algorithm two may include computing a similarity value measuring the similarity of the ES+EP and EO, where ES is a subject embedding of subject S, EP is a predicate embedding for predicate P and EO is an object embedding for object O. In the example shown above, the similarity is computed using a cosine similarity measurement.

Step 4 of algorithm 2 may include training a statistical model using the computed similarity values from step 3 as well as information indicative of whether the similarity values correspond to true or false statements in the copy of the knowledge graph, i.e., whether the similarity values between the predicted and actual object embeddings correspond to true or false statements in the copy of the knowledge graph. In the example above, the statistical model is implemented as a logistic regression model. Step 4 may output a probability for the identified statement.

Accordingly, the vectors $\beta_0$ and $\beta_1$ were trained so that, in general, when there is a subject S and a predicate P, for which the respective embeddings are ES and EP, then, ES+EP should be "mathematically close" (e.g., have a cosine distance close to 0 or a cosine distance of less than 0.1 or less than 0.2) to EO, where EO is an embedding for O, and S, P, O is a True statement (i.e., fact) in the knowledge graph.

For example:

S=SAP

P=is MarketLeaderIn

ES=(1,1)

EP=(2,3)

Continuing the example, the corresponding knowledge graph embeddings may include the following.

Ex=(3.1,3.9)

Ey=(1013414,1352452)

Ez=(0,1)

Further continuing the example, the knowledge graph resources associated with the embeddings Ex, Ey and Ez may be the following:

X=BusinessSoftware

Y=Oracle

Z=BusinessProcessData

Further operations of the statement tagger may be implemented according to algorithm 3, e.g., as follows:

```
Input: Graph G, fact f = (s, p, o) and corresponding embeddings
(s_e, p_e, o_e), model parameters β0 and β1
if F in G and F is Private:
  return Private
if F in G and F is False:
  return False
if exists f' in G with f' = (s, p, x):
  if P owl:maxCardinality = = 1:
    return False
```

$$\text{if } P\left(\frac{(s_e + p_e) \cdot o_e}{\|(s_e + p_e)\| \, \|o_e\|}\right) > 0.5:$$

```
  return True
return False
```

In the example of the statement tagger above, f is a fact from the knowledge graph G and f' is another fact from the knowledge graph G. f and f' have the same subject and predicate but different objects.

Accordingly, algorithm 2 may implement machine learning model training in preparation for statement tagging and algorithm 3 may implement statement tagging based on the machine learning model training carried out in algorithm 2. In algorithm 3, G may be a knowledge graph (e.g., the knowledge graph 100) and F may be an identified statement in data extracted from the network service using the API. $\beta_0$ and $\beta_1$ may be the Logistic Regression parameters output by algorithm 2.

Algorithm 3 includes two conditional statements that involve comparing and identified statement (i.e., fact F) with statements in the knowledge graph 100. If the identified statement matches a statement in the knowledge graph, it is determined whether the statement in the knowledge graph is private or false. If the statement in the knowledge graph is private (e.g., the knowledge graph includes metadata indicating that the respective statement is private), then algorithm 3 returns "private". If the statement in the knowledge graph is false (e.g., the knowledge graph includes metadata indicating that the respective statement is false), then algorithm 3 returns "false". According to algorithm 3, determining whether the identified statement is true or false includes identifying a maximum cardinality of a comparable statement in the knowledge graph (e.g., a statement with the same subject and predicate and a different object) and determining whether the identified statement exceeds the maximum cardinality. In the example of algorithm 3, the maximum cardinality is 1.

When the probability for the identified statement is greater than a specified threshold (e.g., 0.5 as shown above in algorithm 3), it may be determined that the identified statement is true. When the probability for the identified statement is less than or equal to the specified threshold, it may be determined that the identified statement is false.

Algorithm 3 may return false by default. This may be in the interest of improving security in the case of detecting leaks or improving safety in the case of detecting dangerous information.

False or private statements detected via algorithm 3 may cause corresponding warnings to be generated. These warnings may be shown to the user in the monitor of FIG. 7.

FIG. 9 shows an output of the system 700 of FIG. 7. False or private facts are flagged as warnings and identified as work items. The facts can be searched, sorted and examined in further detail (e.g., the facts may be provided as links such that a corresponding web site can be connected to for verification). Identified statements appear in the leftmost column under the heading "Fact". An indication of whether a respective statement is correct appears in the next column under the heading "Correctness". An indication of whether a respective statement is public or private appears under the heading "availability". The rightmost column provides a date indicating when data containing the identified statement was extracted.

Figure 10:
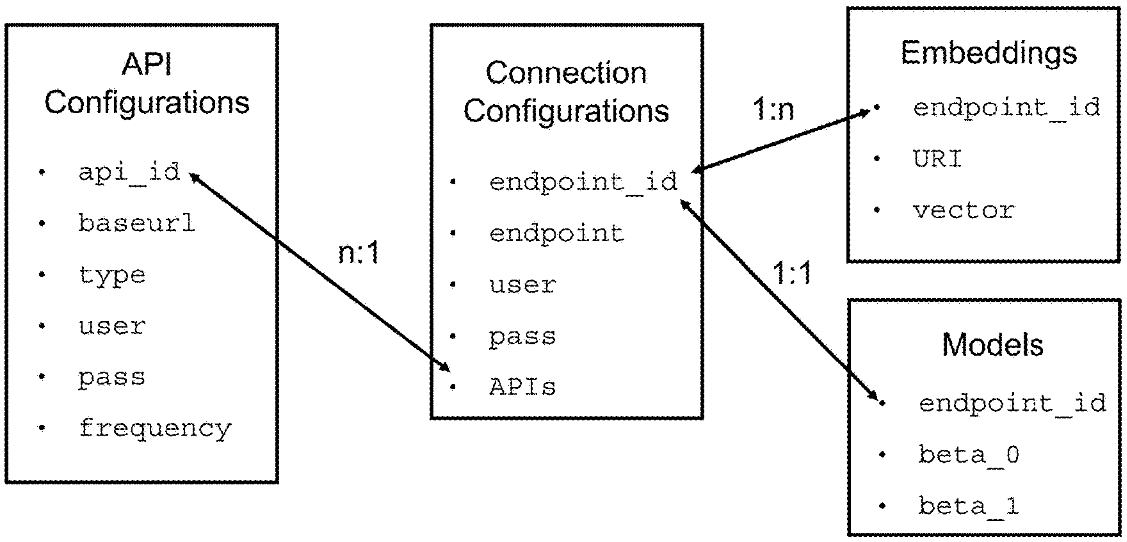
FIG. 10 shows a logical data model according to some embodiments.

FIG. 10 shows a logical data model according to some embodiments. The logical data model may include a plurality of API configurations, e.g., as discussed above in connection with FIG. 5. Each of the API configurations may enable data to be extracted from a corresponding network service. Each API configuration may include an API identifier (api_id), a URL identifying an access point for the API (baseurl), a type indicating how to communicate with the API (e.g., standard or conversational), a login (user), a password (pass) and a frequency (e.g., in minutes) indicating how often to call the API in order to extract data from a corresponding network service (e.g., a frequency of 15 minutes would indicate that the API should be called every 15 minutes). Each API may have at least one configuration. An exemplary API configuration is as follows:

```
api__id: chatgpt
base__url: https://api.openai.com/pqr/tuv
type: conversational
user: dummy__user
pass: *********
frequency: hourly
```

In the example above "user" corresponds to a login id and "pass" corresponds to a password.

The logical data model may include a plurality of connection configurations. There may be exactly one connection configuration for each API configuration, while each connection configuration corresponds to at least one API configuration. Each connection configuration may include an endpoint identifier, an endpoint, a login, a password, and a plurality of APIs. Each connection configuration may correspond to a network service and the endpoint may be a network service. The endpoint identifier may be a combination of an Internet protocol address and a port number.

An exemplary connection configuration is as follows:

```
endpoint__id: BlazeGraph
endpoint: https://blazegraph.abc123.com/#query
user: dummy__user
pass: *******
APIS: chatgpt; twitter
```

Each connection configuration may correspond to at least one set of embeddings. Each set of embeddings may correspond to exactly one connection configuration. The combination of an endpoint identifier, a URI and a vector may be referred to as an embedding container, where the vector may be an embedding. The embeddings may be computed from identified statements and compared to embeddings computed from the knowledge graph in order to determine whether a respective identified statement is true or false and/or to determine whether the respective identified statement is public or private. The embeddings shown in the logical data model may be embeddings that have been computed from the knowledge graph. An example of an embedding container follows:

```
endpoint__id: BlazeGraph
URI: IsMarketLeaderIn
vector: (1,2,25,13)
```

Each connection configuration may be associated with exactly one model. Each model may include an endpoint identifier, as well as the vectors $\beta_0$ and $\beta_1$, as discussed in connection with algorithm 2 above. There may be one machine learning model (e.g., logistic regression model) per knowledge graph endpoint.

Figure 11:
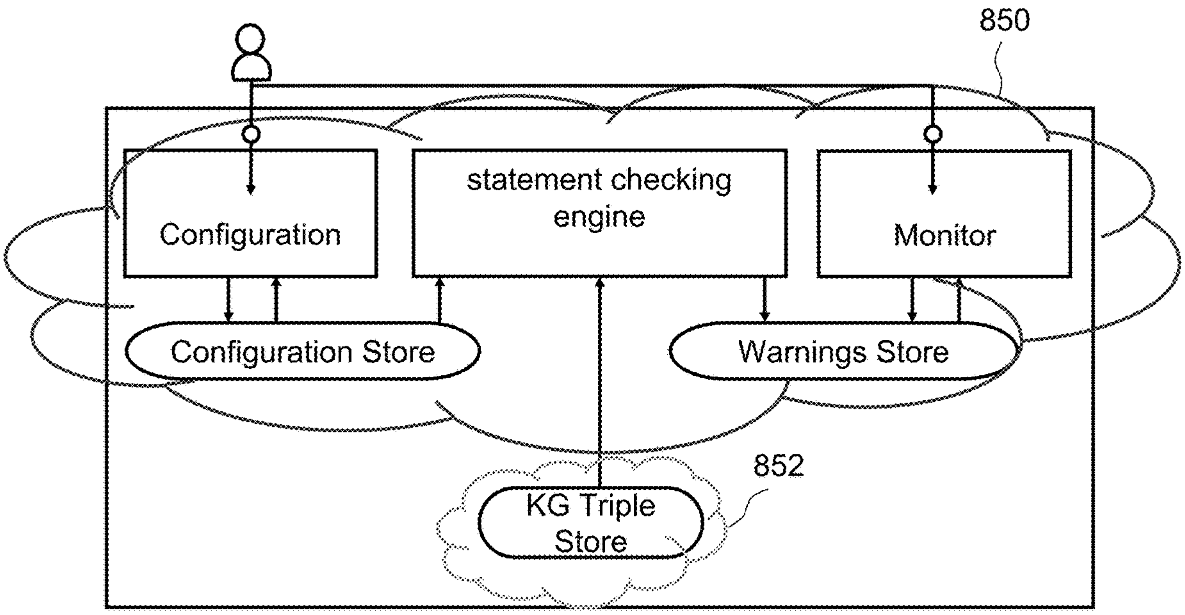
FIG. 11 shows the computer system in a cloud configuration.

FIG. 11 shows a cloud configuration of the computer system of FIG. 7. The cloud configuration of FIG. 11 may be part of a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment (i.e., a cloud environment or cloud) may have one or more of the following characteristics: scalability, multi-tenancy, performance monitoring, virtual resources that are dynamically assignable to different users according to demand, multiple redundant sites, multiple virtual machines, and network accessibility (e.g., via the Internet) from multiple locations (e.g., via a web browser and devices (e.g., mobile device or PC).

In comparison to an on-premises computing environment, the cloud computing environment may have a higher ratio of virtual resources to physical resources (e.g., a higher ratio of virtual machines to physical machines). For example, the ratio of virtual resources (e.g., machines) to physical resources may be at least 10 to 1, at least 20 to 1 or at least 30 to 1 in the cloud computing environment. In contrast, an on-premises computing environment may have less than four virtual resources (e.g., machines) per physical resource.

The cloud computing environment may include a public cloud 850 (i.e., public cloud computing infrastructure) and/or a private cloud 852 (i.e., private cloud computing infrastructure). The public cloud computing infrastructure 850 may involve sharing hardware, storage and/or network resources among multiple organizations or tenants. Services and/or applications may be accessed and managed using a web browser. The private cloud computing infrastructure 852 may include resources exclusively used by one organization or group of users. In comparison to the public cloud computing infrastructure 850, the private cloud infrastructure 852 may provide more flexibility and control, however, the private cloud infrastructure 852 may be more expensive. In both cases, public 850 and private cloud 852 computing infrastructure may be hosted by a service provider, e.g., Microsoft (Azure), Amazon (AWS) or SAP Business Technology Platform.

In the cloud configuration of FIG. 11, the configuration UI and the configuration store may be located in the public cloud 850 and remotely accessible via an API. Similarly, the statement checking engine, the monitor and the warnings store may be located in the public cloud 850. In contrast, the KG triple store may be located in the private cloud 852.

Figure 12:
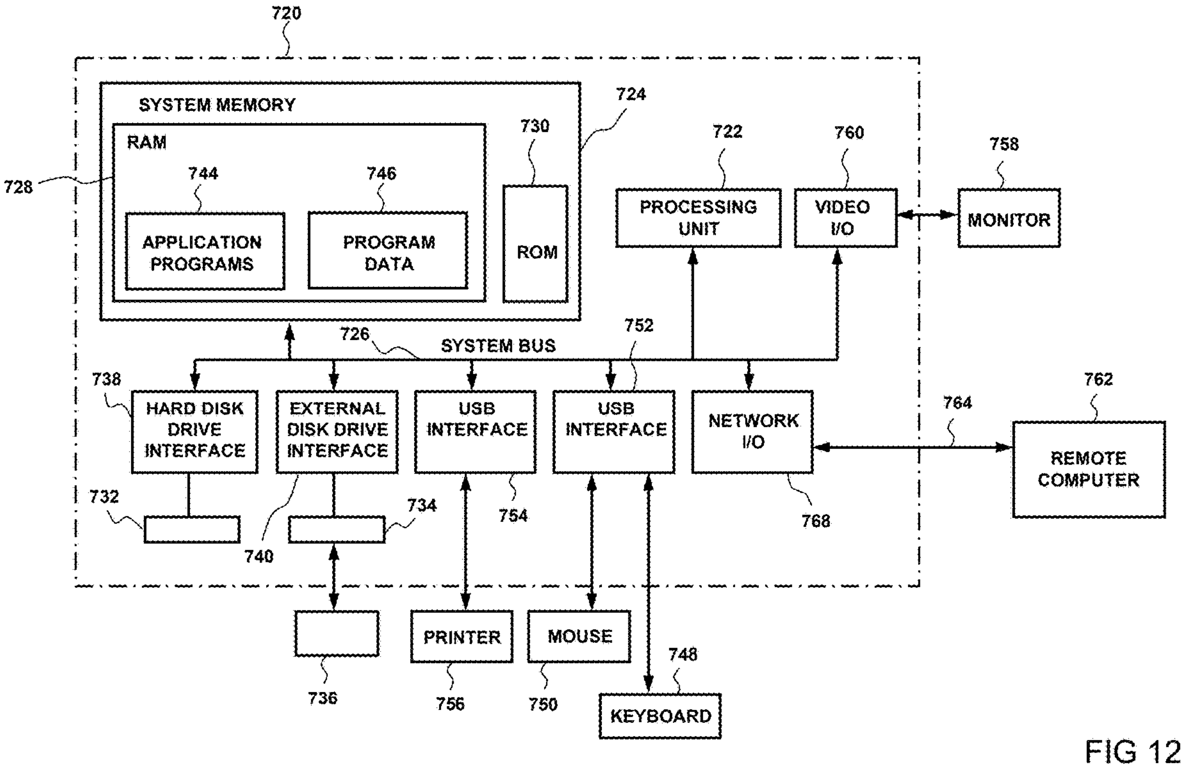
FIG. 12 an exemplary computer system configuration for implementing some embodiments.

FIG. 12 shows an exemplary system for implementing the claimed subject matter including a general-purpose computing device in the form of a conventional computing environment 720 (e.g. a personal computer). The conventional computing environment includes a processing unit 722, a system memory 724, and a system bus 726. The system bus couples various system components including the system memory 724 to the processing unit 722. The processing unit 722 may perform arithmetic, logic and/or control operations by accessing the system memory 724. The system memory 724 may store information and/or instructions for use in combination with the processing unit 722. The system memory 724 may include volatile and non-volatile memory, such as a random-access memory (RAM) 728 and a read only memory (ROM) 730. A basic input/output system (BIOS) containing the basic routines that helps to transfer information between elements within the personal computer 720, such as during start-up, may be stored in the ROM 730. The system bus 726 may be any of several types of bus structures including a memory bus or memory controller, a peripheral bus, and a local bus using any of a variety of bus architectures.

The personal computer 720 may further include a hard disk drive 732 for reading from and writing to a hard disk (not shown), and an external disk drive 734 for reading from or writing to a removable disk 736. The removable disk may be a magnetic disk for a magnetic disk driver or an optical disk such as a CD-ROM for an optical disk drive. The hard disk drive 732 and the external disk drive 734 are connected to the system bus 726 by a hard disk drive interface 738 and an external disk drive interface 740, respectively. The drives and their associated computer-readable media provide non-volatile storage of computer readable instructions, data structures, program modules and other data for the personal computer 720. The data structures may include relevant data for the implementation of the method for detecting data leakage and/or detecting dangerous information. The relevant data may be organized in a database, for example a relational or object database.

Although the exemplary environment described herein employs a hard disk (not shown) and an external disk 736, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 736, ROM 730 or RAM 728, including an operating system (not shown), one or more application programs 744, other program modules (not shown), and program data 746. The application programs may include at least a part of the functionality as depicted in FIG. 16.

A user may enter commands and information, as discussed below, into the personal computer 720 through input devices such as keyboard 748 and mouse 750. Other input devices (not shown) may include a microphone (or other sensors), joystick, game pad, scanner, or the like. These and other input devices may be connected to the processing unit 722 through a serial port interface 752 that is coupled to the system bus 726, or may be collected by other interfaces, such as a parallel port interface 754, game port or a universal serial bus (USB). Further, information may be printed using printer 756. The printer 756, and other parallel input/output devices may be connected to the processing unit 722 through parallel port interface 754. A monitor 758 or other type of display device is also connected to the system bus 726 via an interface, such as a video input/output 760. In addition to the monitor, computing environment 720 may include other peripheral output devices (not shown), such as speakers or other audible output.

The computing environment 720 may communicate with other electronic devices such as a computer, telephone (wired or wireless), personal digital assistant, television, or the like. To communicate, the computer environment 720 may operate in a networked environment using connections to one or more electronic devices. FIG. 16 depicts the computer environment networked with remote computer 762. The remote computer 762 may be another computing environment such as a server, a router, a network PC, a peer device or other common network node, and may include many or all of the elements described above relative to the computing environment 720. The logical connections depicted in FIG. 16 include a local area network (LAN) 764 and a wide area network (WAN) 766. Such networking environments are commonplace in offices, enterprise-wide computer networks, intranets and the Internet and may particularly be encrypted.

When used in a LAN networking environment, the computing environment 720 may be connected to the LAN 764 through a network I/O 768. In a networked environment, program modules depicted relative to the computing environment 720, or portions thereof, may be stored in a remote memory storage device resident on or accessible to remote computer 762. Furthermore, other data relevant to the method for detecting data leakage and/or detecting dangerous information (described above) may be resident on or accessible via the remote computer 762. The network connections shown are exemplary and other means of establishing a communications link between the electronic devices may be used.

The above-described computing system is only one example of the type of computing system that may be used to implement the method for detecting data leakage and/or detecting dangerous information.

The invention claimed is:

1. A computer-implemented method for detecting data leakage and/or detecting dangerous information, the method comprising:

receiving a knowledge graph;

extracting data from at least one network service;

identifying statements in the extracted data;

for each identified statement:

determining whether the identified statement is public or private using the knowledge graph, and determining whether the identified statement is true or false using the knowledge graph;

computing a vector for each uniform resource identifier of the knowledge graph, such that each of the uniform resource identifiers of the knowledge graph has a corresponding vector;

creating a copy of the knowledge graph including the computed vectors; and modifying the copy of the knowledge graph to include a number of true statements that is equal to a number of false statements in the copy of the knowledge graph.

2. The method of claim 1, wherein determining whether the identified statement is true or false using the knowledge graph comprises determining whether a subject-predicate combination of the identified statement has a maximum cardinality;

when the maximum cardinality of the subject-predicate combination of the identified statement is exceeded, determining that the identified statement is false.

3. The method of claim 1, wherein the at least one network service includes one or more of the following: a web service, a social networking service, a service providing an interface to a language model;

wherein extracting data from the at least one network service comprises accessing at least one application programming interface via the at least one network service;

wherein extracting data from the at least one network service comprises web scraping using the Hypertext Transfer Protocol, wherein the web scraping may comprise web crawling.

4. The method of claim 1, wherein the modifying further comprises:

when the copy of the knowledge graph has more false statements than true statements, randomly deleting false statements;

when the copy of the knowledge graph has more true statements than false statements, adding false statements to the copy of the knowledge graph by randomly selecting and combining subjects, predicates and objects from different statements in the knowledge graph;

wherein each component of a statement in the copy of the knowledge graph has a corresponding computed vector;

for each statement in the copy of the knowledge graph, computing, using the computed vectors corresponding to the statements, a similarity value measuring the similarity of the subject and the predicate of the statement to the object of the statement, wherein the similarity value may be computed using a cosine similarity measurement.

5. The method of claim 4, wherein the vectors are computed such that each relation in the knowledge graph is characterized by two vectors, a norm vector of a hyperplane and a translation vector on the hyperplane, wherein the hyperplane is normal to an embedding space of the vectors, wherein the vectors may be computed using TransH.

6. The method of claim 5, further comprising:

training a statistical model using the computed similarity values and information indicative of whether the similarity values correspond to true or false statements in the copy of the knowledge graph, wherein the statistical model is a logistic regression model;

wherein determining whether the identified statement is true or false using the knowledge graph comprises applying the statistical model to the identified statement:

when the trained statistical model returns a probability for the identified statement that is greater than a specified threshold, determining that the identified statement is true;

when the trained statistical model returns a probability for the identified statement that is less than or equal to the specified threshold, determining that the identified statement is false.

7. The method of claim 1, further comprising:

identifying sentences in the extracted data, comprising carrying out term frequency-inverse sentence frequency with stemming and lemmatization on the extracted data;

identifying, using named entity recognition, entities in the extracted data;

identifying, via relation extraction, implied relations between the identified entities, wherein the relation extraction includes deriving structured text from the extracted data;

wherein a result of the named entity recognition and the relation extraction is one or more entity1-predicate-entity2 combinations.

8. The method of claim 7, further comprising:

mapping, via entity linking, the identified entities to the knowledge graph, the mapping comprising named entity disambiguation;

mapping predicates of the identified entity1-predicate-entity2 combinations to properties of the knowledge graph;

providing, based on the mapping of identified entities to the knowledge graph and the mapping of predicates to properties of the knowledge graph, at least one result statement, each result statement including a subject-predicate-object triple, each component of the subject-predicate-object triple including a uniform resource identifier of the knowledge graph.

9. The method of claim 1, wherein determining whether the identified statement is true or false and determining whether the identified statement is public or private comprises comparing the identified statement with statements in the knowledge graph.

10. The method of claim 9, wherein comparing the identified statement with the statements in the knowledge graph comprises determining at least one comparable statement for the identified statement, wherein the comparable statement for the identified statement has at least one value in common with the identified statement;

wherein a plurality of the statements in the knowledge graph include metadata indicating whether the statement is true or false, and/or wherein a plurality of the statements in the knowledge graph include metadata indicating whether the statement is public or private;

wherein determining whether the identified statement is true or false comprises identifying a maximum cardinality of the at least one comparable statement and determining whether the identified statement exceeds the maximum cardinality.

11. The method of claim 1, wherein each statement of the knowledge graph includes a subject-predicate-object triple, wherein each subject-predicate-object triple is composed of a subject, a predicate and an object, wherein the subject, the predicate and the object are each represented by a uniform resource identifier.

12. The method of claim 1, wherein extracting data from the at least one network service comprises randomly selecting a statement from the knowledge graph; wherein the method further comprises:

constructing a query string based on a subject and a predicate of the statement;

calling, using a base uniform resource locator, at least one application programming interface via the at least one network service and using the query string.

13. One or more computer-readable media storing program code that, when executed by a computer, cause the computer to perform a method comprising:

receiving a knowledge graph;

extracting data from at least one network service, wherein extracting data from the at least one network service comprises:

randomly selecting a particular statement from the knowledge graph, constructing a query string based on a subject and a predicate of the statement; and calling, using a base uniform resource locator, at least one application programming interface via the at least one network service and using the query string;

identifying various statements in the extracted data;

for each identified statement:

determining whether the identified statement is public or private using the knowledge graph, and determining whether the identified statement is true or false using the knowledge graph.

14. The one or more computer-readable media storing program code of claim 13, wherein determining whether the identified statement is true or false using the knowledge graph comprises determining whether a subject-predicate combination of the identified statement has a maximum cardinality;

when the maximum cardinality of the subject-predicate combination of the identified statement is exceeded, determining that the identified statement is false.

15. The one or more computer-readable media storing program code of claim 13, wherein each statement of the knowledge graph includes a subject-predicate-object triple, wherein each subject-predicate-object triple is composed of a subject, a predicate and an object, wherein the subject, the predicate and the object are each represented by a uniform resource identifier.

16. A computer system for detecting data leakage and/or detecting dangerous information, the system comprising a memory and at least one processor, the memory including instructions, which, when executed, cause the at least one processor to:

receive a knowledge graph;

extract data from at least one network service;

identify statements in the extracted data;

for each identified statement:

determine whether the identified statement is public or private using the knowledge graph, and determine whether the identified statement is true or false using the knowledge graph, based on a determination of whether a subject-predicate combination of the identified statement has a maximum cardinality, wherein the identified statement is determined to be false in response to determining that the maximum cardinality of the subject-predicate combination of the identified statement is exceeded.

17. The computer system of claim 16, wherein each statement of the knowledge graph includes a subject-predicate-object triple, wherein each subject-predicate-object triple is composed of a subject, a predicate and an object, wherein the subject, the predicate and the object are each represented by a uniform resource identifier.

* * * * *